US012645032B2

(12) United States Patent　　(10) Patent No.:　US 12,645,032 B2

Mouri et al.　　(45) Date of Patent:　Jun. 2, 2026

(54) FUSION SPLICE MACHINE

(71) Applicant: SUMITOMO ELECTRIC INDUSTRIES, LTD., Osaka (JP)

(72) Inventors: Shintaro Mouri, Osaka (JP); Soichi Endo, Osaka (JP); Akinori Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 169 days.

(21) Appl. No.: 18/556,391

(22) PCT Filed: May 11, 2022

(86) PCT No.: PCT/JP2022/019963
§ 371 (c)(1),
(2) Date: Oct. 20, 2023

(87) PCT Pub. No.: WO2022/239809
PCT Pub. Date: Nov. 17, 2022

(65) Prior Publication Data
US 2024/0192445 A1　　Jun. 13, 2024

(30) Foreign Application Priority Data
May 13, 2021　(JP) ................................. 2021-081781

(51) Int. Cl.
G02B 6/255　　(2006.01)
(52) U.S. Cl.
CPC ......... G02B 6/2555 (2013.01); G02B 6/2553 (2013.01)

(58) Field of Classification Search
None
See application file for complete search history.

(56) References Cited

U.S. PATENT DOCUMENTS

| 4,986,843 | A | 1/1991 | Itoh et al. |
| 5,147,434 | A | 9/1992 | Itoh et al. |
| 2002/0031323 | A1 | 3/2002 | Hattori et al. |
| 2004/0091220 | A1 | 5/2004 | Tanabe |
| 2004/0258370 | A1 | 12/2004 | Bush et al. |

(Continued)

FOREIGN PATENT DOCUMENTS

| CN | 107450129 | A | 12/2017 |
| JP | S62-272207 | A | 11/1987 |

(Continued)

OTHER PUBLICATIONS

WO-2011078072-A1 Machine Translation by Clarivate Analytics retrieved Jun. 27, 2025. (Year: 2025).*

(Continued)

*Primary Examiner* — Lisa L Herring
(74) *Attorney, Agent, or Firm* — McDonald Hopkins LLC

(57)　　ABSTRACT

A fusion splicing machine according to one embodiment includes: an optical fiber holder holding an optical fiber in the state where a tip end of the optical fiber protrudes; a rotation mechanism arranged on the opposite side of the optical fiber holder to the tip end of the optical fiber and rotating the optical fiber holder around the axis extending along the optical fiber; and a clamp unit pressing the tip end portion of the optical fiber held by the optical fiber holder. The rotation mechanism rotates the clamp unit together with the optical fiber holder.

7 Claims, 8 Drawing Sheets

(56)         References Cited

U.S. PATENT DOCUMENTS

2007/0036508 A1     2/2007  Sato
2019/0339453 A1 *  11/2019  Matsuda .............. G02B 6/3616

FOREIGN PATENT DOCUMENTS

| JP | 2001-066456 A | 3/2001 | | |
| JP | 2003-315595 A | 11/2003 | | |
| JP | 2004-012799 A | 1/2004 | | |
| JP | 2005-164792 A | 6/2005 | | |
| JP | 2005-164985 A | 6/2005 | | |
| JP | 2007-047407 A | 2/2007 | | |
| JP | 2010-128290 A | 6/2010 | | |
| JP | 2012073374 A * | 4/2012 | .............. | G02B 6/25 |
| WO | 02/004998 A1 | 1/2002 | | |
| WO | WO-2011078072 A1 * | 6/2011 | .......... | G02B 6/6641 |

OTHER PUBLICATIONS

JP-2012073374-A Machine Translation by Clarivate Analytics retrieved
Jun. 27, 2025. (Year: 2025).*
International Search Report issued in Patent Application No. PCT/
JP2022/019963 dated Jun. 21, 2022.

* cited by examiner

FUSION SPLICE MACHINE

TECHNICAL FIELD

The present disclosure relates to fusion splicing machines.

This application claims priority based on Japanese Patent Application No. 2021-081781 dated May 13, 2021, and incorporates all the descriptions described in the Japanese Patent Application.

BACKGROUND ART

Patent Literature 1 describes an alignment device of an optical fiber used when performing fusion splicing of optical fibers. An optical fiber holding tool holding the optical fiber core wire is attached to the alignment device. The alignment device has a notch and a mounting base. The optical fiber holding tool is placed on an installation base in the state of being inserted into the notch of the alignment device. The optical fiber holding tool has a holding platform, the core wire holding groove portion formed in the holding platform, and the cover closes the core wire holding groove portion. The optical fiber core wire is inserted into the core wire holding groove portion, and the optical fiber is held by closing the core wire holding groove portion into which the optical fiber core wire is inserted with the cover.

Patent Literature 2 describes a fusion splicing machine provided with a rotation mechanism clamping an optical fiber and rotating the optical fiber around an axis of the clamped optical fiber. The fusion splicing machine includes a V-groove block into which the optical fiber is inserted, a fiber clamp pressing the optical fiber inserted into the V-groove block, a block on which a coated portion of the optical fiber is placed, and a sheath clamp pressing the optical fiber placed on the block. The rotation mechanism sets the V-groove block and the block and rotates the optical fiber pressed by the fiber clamp and the sheath clamp.

Patent Literature 3 describes a fusion splicing machine for fusion splicing optical fibers. The fusion splicing machine has a main body in which a pair of optical fibers are butted. The main body includes a pair of holder bases and a pair of holders placed on the holder bases in the case of grasping the optical fiber. Each holder grasping the two optical fibers is set on each holder base. The fusion splicing machine includes a clamp arm capable of moving up and down with respect to the optical fiber and a rotation mechanism rotating the optical fiber. In this fusion splicing machine, the rotation mechanism rotates the optical fiber in the case where the clamp arm is separated from the optical fiber.

CITATION LIST

Patent Literature

Patent Literature 1: Japanese Unexamined Patent Publication No. 2004-12799
Patent Literature 2: Japanese Unexamined Patent Publication No. S62-272207
Patent Literature 3: Japanese Unexamined Patent Publication No. 2005-164792

SUMMARY OF INVENTION

A fusion splicing machine according to the present disclosure includes: an optical fiber holder holding an optical fiber in the state where a tip end of the optical fiber protrudes; a rotation mechanism arranged on the opposite side of the optical fiber holder to the tip end of the optical fiber and rotating the optical fiber holder around the axis extending along the optical fiber; and a clamp unit pressing the tip end portion of the optical fiber held by the optical fiber holder. The rotation mechanism rotates the clamp unit together with the optical fiber holder.

Advantageous Effects of Invention

According to the present disclosure, it is possible to prevent the optical fiber from being damaged and to efficiently rotate the optical fiber.

DESCRIPTION OF EMBODIMENTS

Figure 1:
FIG. 1 is a diagram schematically illustrating a fusion splicing machine according to an embodiment.

In the related art, in a fusion splicing machine, a clamp arm presses an optical fiber, and a rotation mechanism rotates the optical fiber in the state where the clamp arm is separated from the optical fiber. As a result, the operation of each component becomes complicated and takes time, which may cause the problem that the optical fiber cannot be efficiently rotated.

When rotating the optical fiber pressed down by the clamp, there is a concern that the optical fiber may be damaged during rotation. When rotating the optical fiber pressed by the clamp, there may be a problem in that the desired rotation cannot be obtained if the pressing force of the clamp against the optical fiber is not appropriate. That is, fine adjustment of the pressing force of the clamp may be required to obtain the desired rotation.

An object of the present disclosure is to provide a fusion splicing machine capable of suppressing damage to optical fibers and efficiently rotating optical fibers.

Description of Embodiments of Present Disclosure

First, contents of embodiments of the present disclosure will be listed and described. A fusion splicing machine according to an embodiment of the present disclosure includes: an optical fiber holder holding an optical fiber in the state where a tip end of the optical fiber protrudes; a rotation mechanism arranged on the opposite side of the optical fiber holder to the tip end of the optical fiber and rotating the optical fiber holder around the axis extending along the optical fiber; and a clamp unit pressing the tip end portion of the optical fiber held by the optical fiber holder. The rotation mechanism rotates the clamp unit together with the optical fiber holder.

In this fusion splicing machine, the optical fiber holder holds the optical fiber in the state of allowing the tip end of the optical fiber to protrude. The rotation mechanism for rotating the optical fiber holder is arranged on the side opposite to the tip end of the optical fiber with respect to the optical fiber holder. The fusion splicing machine includes the clamp unit pressing the tip end portion of the optical fiber held by the optical fiber holder. The rotation mechanism rotates the clamp unit together with the optical fiber holder. Since the rotation mechanism rotates the optical fiber in the state where the clamp unit presses the optical fiber, the optical fiber can be efficiently rotated. The rotation mecha- nism rotates the clamp unit pressing the optical fiber together with the optical fiber holder. Therefore, since the clamp unit pressing the optical fiber rotates together with the optical fiber holder during rotation of the optical fiber, the optical fiber can be prevented from being damaged during rotation. By rotating the clamp unit pressing the optical fiber together with the optical fiber, there is no need for fine adjustment of the pressing force of the clamp unit against the optical fiber. Therefore, since desired rotation can be obtained, the optical fiber can be rotated more efficiently.

The optical fiber holder may have the V-groove on which the optical fiber is mounted. The clamp unit may have the pressing portion pressing the optical fiber placed on the V-groove. The pressing portion may include the elastic member deformable toward the V-groove. In this case, since the pressing portion pressing the optical fiber includes the elastic member deformable toward the V-groove, the optical fiber can be pressed with the appropriate force.

The pressing portion may include the elastic member extending along the V-groove. In this case, since the press- ing portion pressing the optical fiber includes the elastic member extending along the V-groove, the optical fiber can be pressed with the appropriate force.

The pressing portion may have the arm portion extending along the V-groove and the tip end portion provided at one longitudinal end of the arm portion for pressing the optical fiber. In this case, the pressing portion pressing the optical fiber can be configured with the arm portion extending along the V-groove and the tip end portion.

The fusion splicing machine described above may include the holder base on which the optical fiber holder is mounted and fixed to the rotation mechanism. The optical fiber holder may be removable with respect to the holder base. In this case, since the optical fiber holder is detachable from the holder base fixed to the rotation mechanism, the optical fiber can be easily attached to and detached from the rotation mechanism.

The holder base may be made of metal. The optical fiber holder may have the first end portion positioned at the side opposite to the rotation mechanism, and the holder base may have the second end portion positioned at the side opposite to the rotation mechanism. The second end portion may be provided at the position further separated from the tip end than the first end portion. In this case, the second end portion of the metal holder base can be further separated from the tip end of the optical fiber than the first end portion of the optical fiber holder. Therefore, when the tip end of the optical fiber is fusion-spliced by electric discharge, the influence of the electric discharge on the metal holder base can be reduced.

Details of Embodiment of Present Disclosure

Hereinafter, specific examples of the fusion splicing machine according to the present disclosure will be described below with reference to the drawings. In the description of the drawings, the same or corresponding elements are denoted by the same reference numerals, and overlapping descriptions are omitted as appropriate. The drawings may be simplified or exaggerated for easy under- standing, and dimensional ratios and the like are not limited to those described in the drawings.

First, the configuration of the fusion splicing machine according to this embodiment will be described with refer- ence to FIG. 1. FIG. 1 is a diagram describing the outline of the fusion splicing machine according to this embodiment. As illustrated in FIG. 1, a fusion splicing machine 1 fusion- splices a pair of optical fibers F to each other. The fusion splicing machine 1 has an optical fiber holder 10 having a V-groove 11 and a rotation mechanism 20 rotating the optical fiber holder 10.

The fusion splicing machine 1 includes the pair of optical fiber holders 10 arranged along the Z-axis direction, and a pair of rotation mechanisms 20 arranged along the Z-axis direction. The Z-axis direction is the direction in which the V-groove 11 formed along one direction is to extend and is a central axis direction of the optical fiber F placed and extending in the V-groove 11. The optical fiber F which is a fusion-splicing target is positioned in the V-groove 11 of each optical fiber holder 10. The optical fiber holder 10 is made of, as an example, resin. The optical fiber holder 10 holds, for example, the coated portion of the optical fiber F. The optical fiber holder 10 holds the tip end F1 of the optical fiber F, from which the coating is removed and the glass fiber is exposed, in the state of protruding in the Z-axis direction.

The pair of discharge electrodes 2 are arranged at posi- tions where the tip ends F1 of the pair of optical fibers F face each other. The pair of discharge electrodes 2 are arranged at positions facing each other along the direction intersecting the optical fiber F (for example, the X-axis direction). The optical fiber holder 10 has, for example, a base 12 in which the V-groove 11 extending along one direction (for example, the Z-axis direction) is formed and the optical fiber F is mounted and a lid 13 mounted on the base 12. The base 12 and the lid 13 are arranged, for example, along the Y-axis direction intersecting both the X-axis direction and the Z-axis direction.

The pair of discharge electrodes 2 fusion-splice the tip ends F1 of the pair of optical fibers F by discharge. For example, the fusion splicing machine 1 has a control unit 3 controlling each unit of the fusion splicing machine 1. By controlling the discharge current and the discharge time of the discharge electrode 2 by the control unit 3, the fusion- splicing is performed under the fusion-splicing conditions suitable for the type of the optical fiber F. In the fusion splicing machine 1, position-alignment of the pair of optical fibers F is performed by the control unit 3.

The control unit 3 adjusts the position of each optical fiber F in the X-axis direction and the Y-axis direction and aligns the axes of the pair of optical fibers F so that the pair of optical fibers F are arranged in a straight line along the Z-axis direction. That is, the control unit 3 performs align- ment of the pair of optical fibers F in the X-axis direction, the Y-axis direction, and the Z-axis direction. Furthermore, the control unit 3 controls the rotation mechanism 20 to rotate the optical fiber F around the Z-axis, which is the direction in which the optical fiber F extends and is the central axis of the optical fiber F, so that alignment is performed in the θ direction. Further, the rotation center axis of the optical fiber F may be the same as the Z-axis, or may be the axis parallel to the Z-axis and different from the Z-axis.

The optical fiber F is, for example, an optical fiber that requires rotational alignment in the fusion splicing machine 1. That is, the optical fiber F is an optical fiber that needs to match the positions of the pair of optical fibers F in the θ direction. Specifically, for example, the optical fiber F is a multi core fiber (MCF) or a polarization maintaining fiber (PMF).

Figure 2:
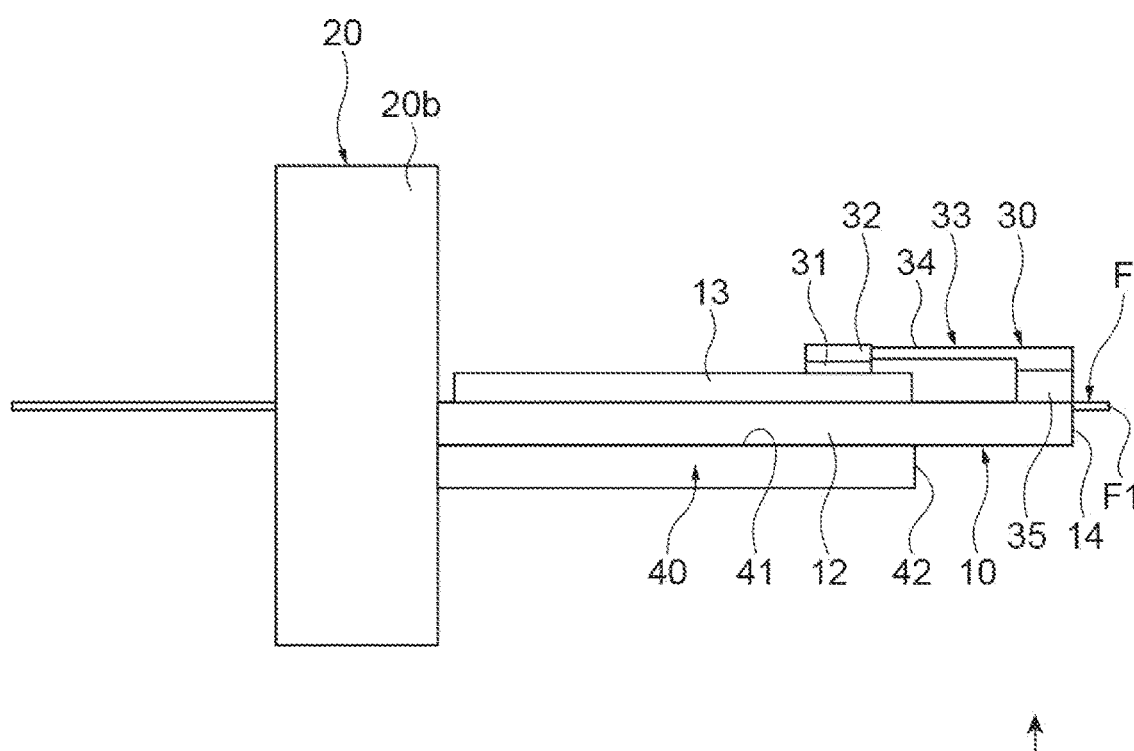
FIG. 2 is a side view schematically illustrating an optical fiber holder, a rotation mechanism, and a clamp unit of the fusion splicing machine according to the embodiment.
Figure 2:
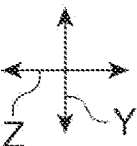
Figure 3:
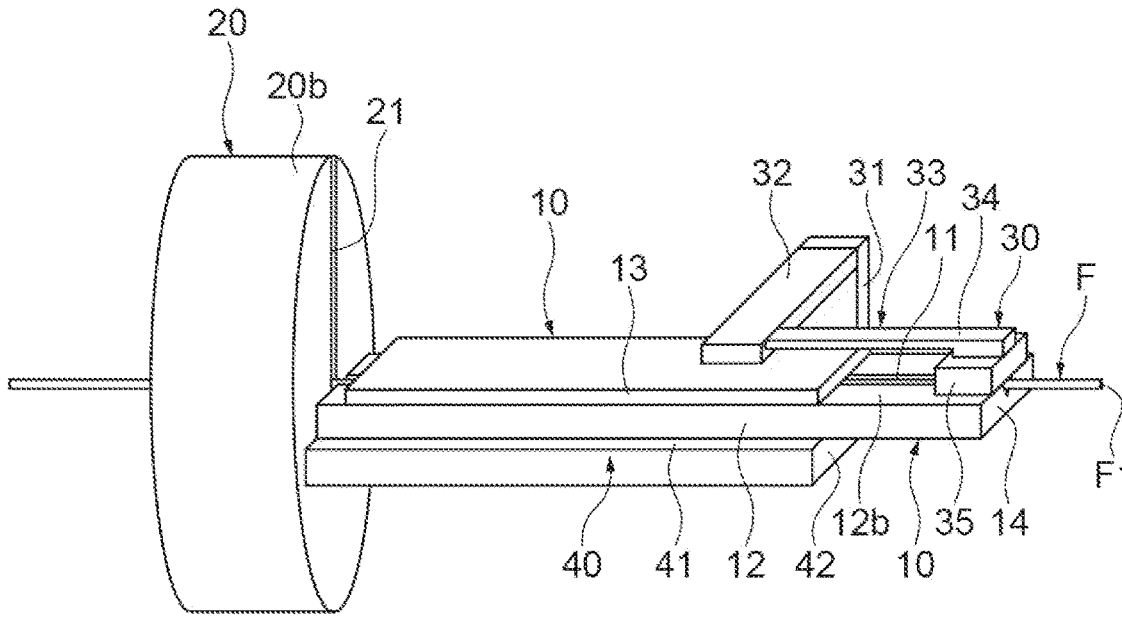
FIG. 3 is a perspective view schematically illustrating the optical fiber holder, the rotation mechanism, and the clamp unit in FIG. 2.
Figure 3:
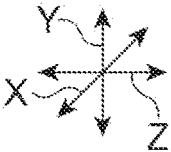

FIG. 2 is a side view illustrating the optical fiber holder 10 and the rotation mechanism 20 of the fusion splicing machine 1. FIG. 3 is a perspective view illustrating the optical fiber holder 10 and the rotation mechanism 20 of the fusion splicing machine 1. As illustrated in FIGS. 2 and 3, the fusion splicing machine 1 includes the clamp unit 30 pressing the tip end F1 side portion of the optical fiber F held by the optical fiber holder 10 and the holder base 40 fixed to the rotation mechanism 20.

The portion of the optical fiber F pressed by the clamp unit 30 is, for example, the coated portion of the optical fiber F. In this case, only the portion of the optical fiber F protruding from the optical fiber holder 10 is the portion from which the coating is removed. However, the portion pressed by the clamp unit 30 may be the portion from which the coating of the optical fiber F is removed (for example, the portion where the glass of the optical fiber F is exposed). The length of the portion of the optical fiber F protruding from the optical fiber holder 10 is, for example, 5 mm or less (as an example, 3 mm).

The holder base 40 is made of, for example, metal. The holder base 40 has a mounting surface 41 on which the optical fiber holder 10 is mounted. The light source for observing the end face of the tip end F1 of, for example, the optical fiber F may be mounted on the mounting surface 41. The light source, for example, allows the light to be incident on the pressed optical fiber F from the side. The light from the light source is laterally incident on the pressed portion of the optical fiber F, so that the core on the end face of the tip end F1 of the optical fiber F can be observed. However, the position of the light source is not limited to the mounting surface 41 of the holder base 40 and can be changed as appropriate. For example, the light source may allow the light to be incident on the optical fiber F from the end of the optical fiber F opposite to the tip end F1.

For example, the optical fiber holder 10 is detachable from the holder base 40. In this case, the optical fiber F can be held in the optical fiber holder 10 removed from the holder base 40, and the optical fiber holder 10 holding the optical fiber F can be mounted on the holder base 40. Furthermore, the optical fiber holder can be replaced with the optical fiber holder 10 having the appropriate V-groove 11 according to the diameter of the optical fiber F (coating diameter or glass diameter).

The holder base 40 extends from the rotation mechanism 20 in the Z-axis direction. The length of the base 12 of the optical fiber holder 10 in the Z-axis direction is longer than the length of the lid 13 of the optical fiber holder 10 in the Z-axis direction. For example, the base 12 extends to the opposite side of the rotation mechanism 20 beyond the lid 13. In this case, the base 12 has an exposed portion 12*b* where a portion of the V-groove 11 is exposed on the side opposite to the rotation mechanism 20. The optical fiber F placed on the V-groove 11 exposed to the exposed portion 12*b* is pressed by the clamp unit 30.

The optical fiber holder 10 (base 12) has a first end portion 14 positioned at the side opposite to the rotation mechanism 20. The holder base 40 has a second end portion 42 positioned at the side opposite to the rotation mechanism 20. The second end portion 42 is provided at the position further separated from the tip end F1 than the first end portion 14. That is, the distance from the rotation mechanism 20 to the second end portion 42 in the Z-axis direction is shorter than the distance from the rotation mechanism 20 to the first end portion 14 in the Z-axis direction.

The rotation mechanism 20 is arranged on the opposite side of the optical fiber holder 10 from the tip end F1. The rotation mechanism 20 has, for example, a recessed portion 21 into which the optical fiber F is inserted. As an example, the rotation mechanism 20 has a cylindrical shape. The recessed portion 21 has a slit shape recessed along the Y-axis direction from an outer peripheral surface 20*b* of the rotation mechanism 20. The rotation mechanism 20 rotates the optical fiber F together with the holder base 40, the optical fiber holder 10, and the clamp unit 30 around the central axis of the optical fiber F, which is the axis extending along the optical fiber F, for example, around the Z-axis. The rotation center axis of the optical fiber F may be the same as the Z-axis or may be the axis parallel to the Z-axis and different from the Z-axis.

Figure 4:
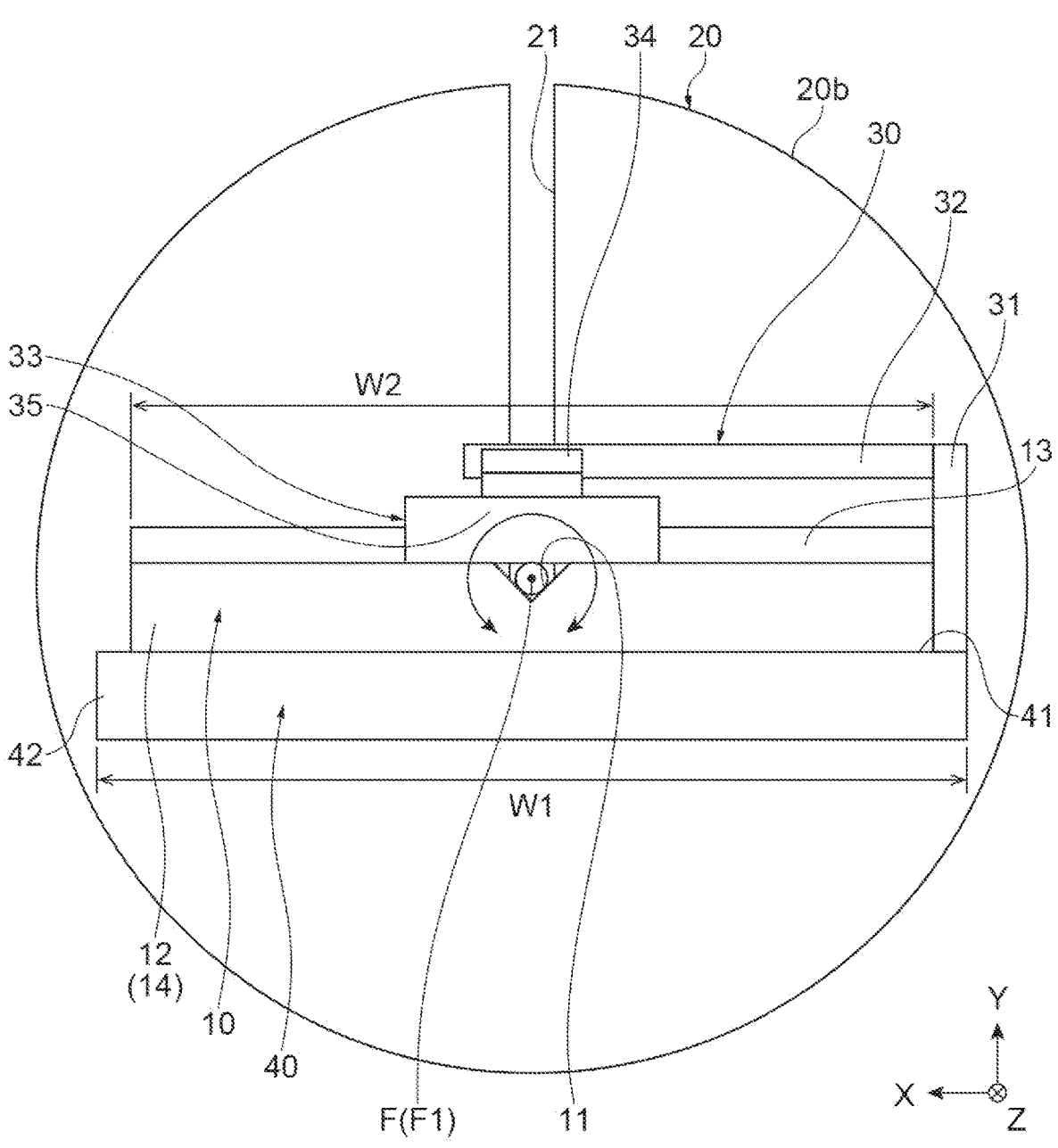
FIG. 4 is a front view schematically illustrating the optical fiber holder, the rotation mechanism, and the clamp unit in FIG. 2.

FIG. 4 is a front view of the optical fiber holder 10, the rotation mechanism 20, the clamp unit 30, and the holder base 40 when viewed along the Z-axis direction from the tip end F1 side. The rotation mechanism 20 includes, for example, the motor (not illustrated) and the gears (not illustrated). In this case, the motor of the rotation mechanism 20 is driven, and the rotational driving force of the motor is transmitted to the holder base 40, the optical fiber holder 10, and the clamp unit 30 through the gears, so that the holder base 40, the optical fiber holder 10, and the clamp unit 30 rotate together. The optical fiber F is inserted into the recessed portion 21 of the rotation mechanism 20 and held by the optical fiber holder 10, so that the optical fiber F rotates as the rotation of the optical fiber holder 10 by the rotation mechanism 20.

For example, the rotation mechanism 20 rotates the optical fiber F, the optical fiber holder 10, the clamp unit 30, and the holder base 40 around the Z-axis extending along the optical fiber F. For example, the clamp unit 30, the holder base 40, and the optical fiber holder 10 are within the range closer to the central axis than the outer periphery of the rotation mechanism 20 when viewed from the Z-axis direction. In this case, it is possible to achieve further miniaturization, which is preferable. The rotation center axis of the optical fiber F may be the axis parallel to the Z-axis and different from the Z-axis.

The clamp unit 30 is provided, for example, to stabilize the optical fiber F protruding from the optical fiber holder 10. The clamp unit 30 includes, for example, a fixing portion 31 fixed to the holder base 40, an extension portion 32 extending in the width direction (for example, the X-axis direction) of the holder base 40 from the end portion of the fixing portion 31 opposite to the holder base 40, and a pressing portion 33 extending from the extension portion 32 along the V-groove 11.

The fixing portion 31 is fixed, for example, to the mounting surface 41 of the holder base 40. The height of the fixing portion 31 with respect to the mounting surface 41 is larger than the height of the optical fiber holder 10 (lid 13) with respect to the mounting surface 41. The extension portion 32 extends in the width direction of the holder base 40 from the fixing portion 31 and faces the lid 13 of the optical fiber holder 10. For example, the clamp unit 30 may include a swing mechanism (not illustrated) that swings a tip end portion 35 around the axis extending in the Z-axis direction on the mounting surface 41. The "axis extending in the Z-axis direction" may be the Z-axis, or may be the axis parallel to the Z-axis and different from the Z-axis. In this case, the tip end portion 35 can be swung in the direction reaching the V-groove 11 and the direction (for example, the Y-axis direction) separated from the V-groove 11.

The pressing portion 33 extends, for example, from the extension portion 32 along the Z-axis direction. For example, at least a portion of the pressing portion 33 is configured with the elastic member. In this case, the pressing portion 33 has the elasticity to bend in the direction reaching the V-groove 11 and the direction (for example, the Y-axis direction) separated from the V-groove 11. The pressing portion 33 has an arm portion 34 extending along the V-groove 11 and the tip end portion 35 positioned at the side opposite to the extension portion 32 of the arm portion 34.

As an example, the arm portion 34 is a leaf spring. The arm portion 34 extends from the extension portion 32 along the Z-axis direction. The tip end portion 35 is provided at one end of the arm portion 34 in the longitudinal direction (for example, the Z-axis direction). The tip end portion 35 presses the optical fiber F placed in the V-groove 11 at the tip end of the arm portion 34 (the end portion opposite to the extension portion 32). For example, the tip end portion 35 protrudes from the arm portion 34 toward the optical fiber holder 10 (base 12). As an example, the tip end portion 35 has a rectangular shape.

Next, functions and effects obtained from the fusion splicing machine 1 according to this embodiment will be described. In the fusion splicing machine 1, the optical fiber holder 10 holds the optical fiber F in the state of allowing the tip end F1 of the optical fiber F to protrude. The rotation mechanism 20 rotating the optical fiber holder 10 is arranged at the side opposite to the tip end F1 of the optical fiber holder 10. The fusion splicing machine 1 includes the clamp unit 30 pressing the tip end F1 side portion of the optical fiber F held by the optical fiber holder 10. Then, the rotation mechanism 20 rotates the clamp unit 30 together with the optical fiber holder 10. Therefore, since the rotation mechanism 20 rotates the optical fiber F in the state where the clamp unit 30 presses the optical fiber F, the optical fiber F can be efficiently rotated.

The rotation mechanism 20 rotates the clamp unit 30 pressing the optical fiber F together with the optical fiber holder 10. Therefore, since the clamp unit 30 pressing the optical fiber F rotates together with the optical fiber holder 10 during rotation of the optical fiber F, the optical fiber F can be prevented from being damaged during rotation. That is, since the optical fiber F, the optical fiber holder 10 holding the optical fiber F, and the clamp unit 30 rotate together, the optical fiber F does not rub against parts of the fusion splicing machine 1 due to the rotation, so that occurrence of scratches on the optical fiber F can be avoided.

By rotating the clamp unit 30 pressing the optical fiber F together with the optical fiber F, there is no need of fine adjustment of the pressing force of the clamp unit 30 against the optical fiber F. That is, the clamp unit 30 may apply the pressing force to the extent that the optical fiber F does not slip out of the V-groove 11. Therefore, since desired rotation can be obtained, the optical fiber F can be rotated more efficiently.

The optical fiber holder 10 may have the V-groove 11 on which the optical fiber F is placed. The clamp unit 30 may have the pressing portion 33 pressing the optical fiber F placed on the V-groove 11. As an example, the clamp unit 30 may have a magnet. The magnet may be provided in the fixing portion or the extension portion to apply the pressing force to the optical fiber F, and the optical fiber F may be pressed using the magnetic force between the fixing portion and the extension portion. The magnet may be provided in the pressing portion 33, and the optical fiber F may be pressed using the attractive force or repulsive force of the magnet. The pressing portion 33 may include the elastic member (arm portion 34 as an example) extending along the V-groove 11. In this case, the pressing portion 33 pressing the optical fiber F includes the elastic member that can be deformed in the direction toward the V-groove 11 (the Y-axis direction), so that the pressing portion 33 has a cushioning property and the optical fiber F can be pressed with the appropriate force.

The pressing portion 33 may have the arm portion 34 extending along the V-groove 11 and the tip end portion 35 provided at one longitudinal end of the arm portion 34 to press the optical fiber F. In this case, the pressing portion 33 pressing the optical fiber F can be configured with the arm portion 34 extending along the V-groove 11 and the tip end portion 35.

The fusion splicing machine 1 may include the holder base 40 on which the optical fiber holder 10 is mounted and fixed to the rotation mechanism 20. The optical fiber holder 10 may be detachable from the holder base 40. In this case, since the optical fiber holder 10 is detachable from the holder base 40 fixed to the rotation mechanism 20, the optical fiber F can be easily attached to and detached from the rotation mechanism 20.

The holder base 40 may be made of metal. The optical fiber holder 10 may have the first end portion 14 positioned at the side opposite to the rotation mechanism 20, and the holder base 40 may have the second end portion 42 positioned at the side opposite to the rotation mechanism 20. The second end portion 42 may be provided at the position further separated from the tip end portion F1 than the first end portion 14. In this case, the second end portion 42 of the metal holder base 40 can be further separated from the tip end F1 of the optical fiber F than the first end portion 14 of the optical fiber holder 10. Therefore, when the tip end F1 of the optical fiber F is fusion-spliced by electric discharge, the influence of the metal holder base 40 on the electric discharge can be reduced.

The holder base 40 may be made of a non-conductive material such as resin. In this case, when the tip end F1 of the optical fiber F is fusion-spliced by electric discharge, the influence of the holder base 40 on electric discharge can be reduced.

Figure 5:
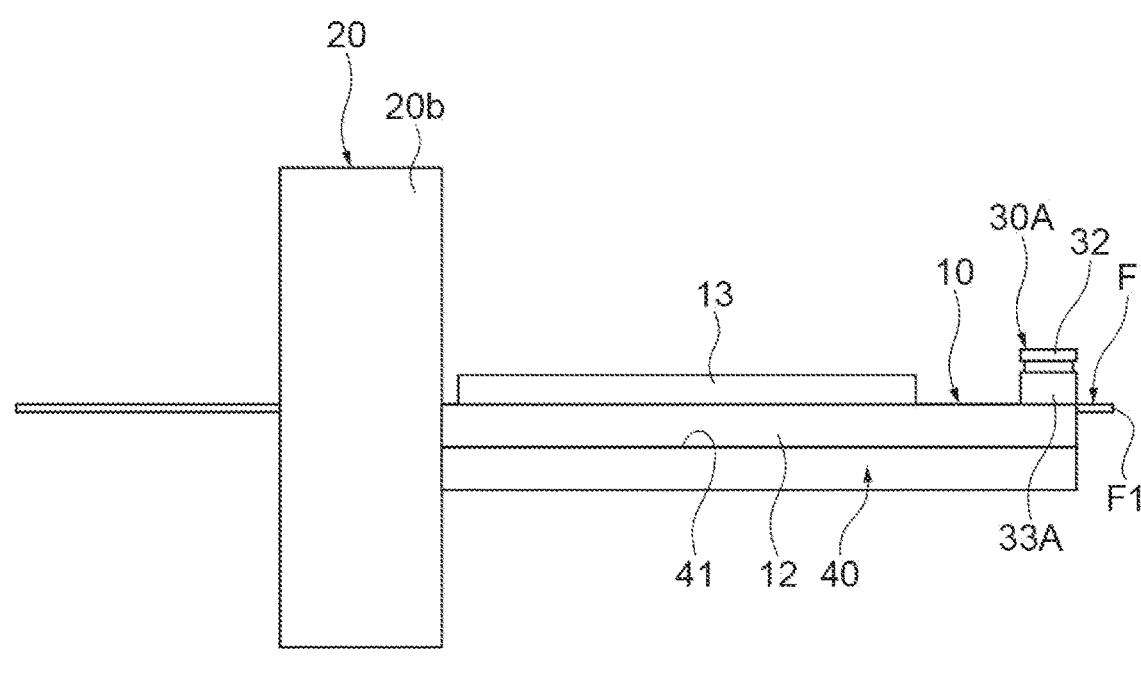
FIG. 5 is a side view schematically illustrating an optical fiber holder, a rotation mechanism, and a clamp unit according to Modified Example.
Figure 6:
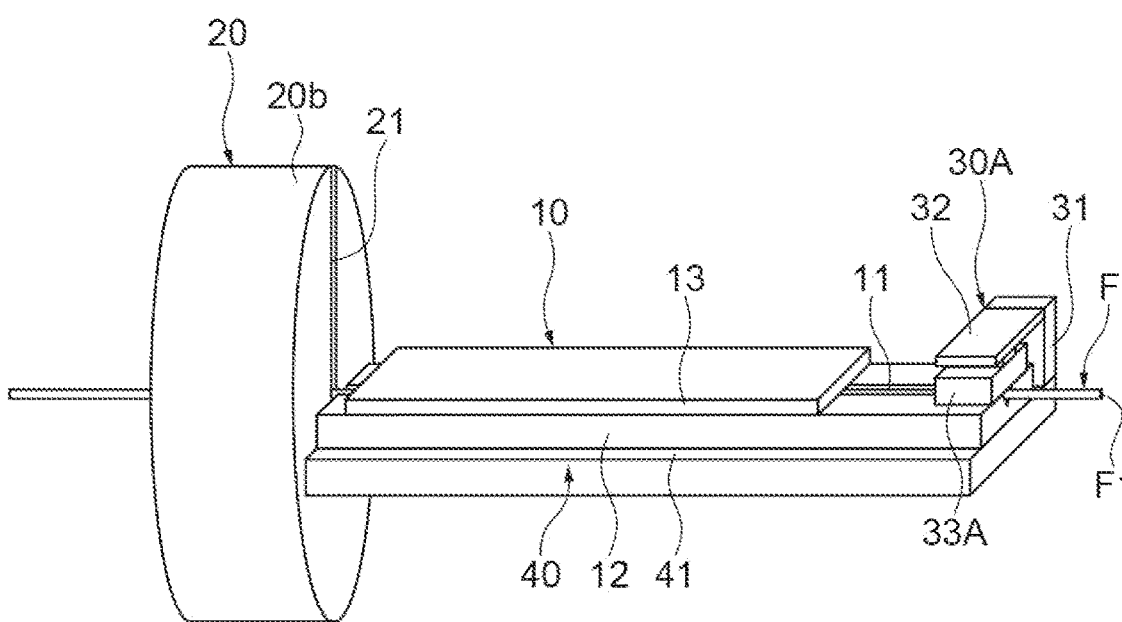
FIG. 6 is a perspective view schematically illustrating the optical fiber holder, the rotation mechanism, and the clamp unit in FIG. 5.
Figure 6:
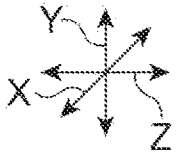

Next, the fusion splicing machine according to Modified Example will be described. FIG. 5 is a side view illustrating the optical fiber holder 10, the rotation mechanism 20, the clamp unit 30A, and the holder base 40 of the fusion splicing machine according to Modified Example. FIG. 6 is a perspective view illustrating the optical fiber holder 10, the rotation mechanism 20, a clamp unit 30A, and the holder base 40. As illustrated in FIGS. 5 and 6, in the fusion splicing machine according to Modified Example, the configuration of the clamp unit 30A is different from the configuration of the clamp unit 30 described above. In the following description, the same configuration as those of the fusion splicing machine 1 described above are denoted by the same reference numerals, and overlapping descriptions are omitted as appropriate.

The clamp unit 30A includes, for example, the fixing portion 31 fixed to the holder base 40, the extension portion 32 extending in the width direction of the holder base 40 from the end portion of the fixing portion 31 opposite to the holder base 40, and a pressing portion 33A protruding from the extension portion 32 toward the optical fiber holder 10 (base 12). The pressing portion 33A does not have the arm portion 34 unlike the pressing portion 33 described above. The pressing portion 33A presses the optical fiber F placed in the V-groove 11. The extension portion 32 may contain the elastic member. In this case, the pressing portion 33A pressing the optical fiber F includes the elastic member that can be deformed in the direction (the Y-axis direction) toward the V-groove 11, so that the pressing portion 33A has a cushioning property and the optical fiber F can be pressed with the appropriate force.

As an example, the pressing portion 33A has a rectangular shape. The clamp unit 30A includes, for example, a swing mechanism that swings the pressing portion 33A, same as the clamp unit 30 described above. By swinging the pressing portion 33A with the swing mechanism, the pressing portion 33A can be swung in the direction reaching the V-groove 11 and the direction (for example, the Y-axis direction) separated from the V-groove 11.

As described above, in the fusion splicing machine according to Modified Example, the rotation mechanism 20 rotates the clamp unit 30A together with the optical fiber holder 10. Therefore, since the rotation mechanism 20 rotates the optical fiber F in the state where the clamp unit 30A presses the optical fiber F, the optical fiber F can be efficiently rotated. Since the clamp unit 30A pressing the optical fiber F rotates together with the optical fiber holder 10 when the optical fiber F rotates, the optical fiber F can be prevented from being damaged during rotation. Therefore, the fusion splicing machine according to Modified Example can obtain the same functions and effects as the fusion splicing machine 1 described above.

Figure 7:
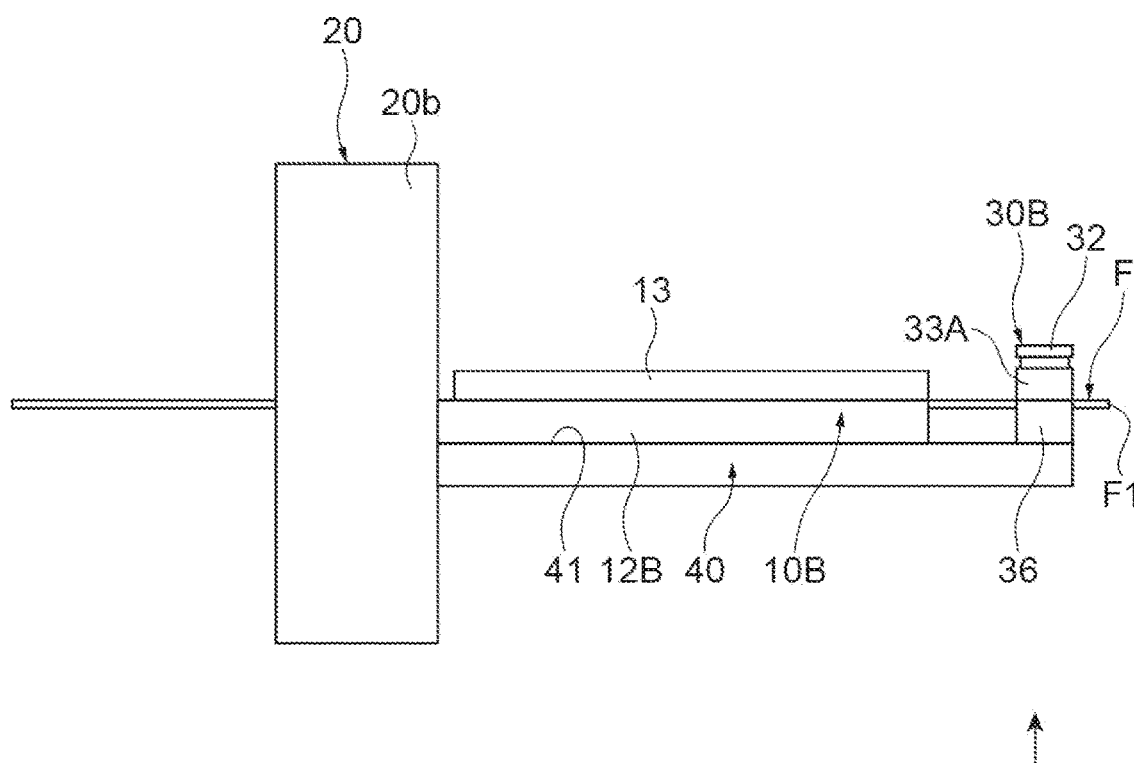
FIG. 7 is a side view schematically illustrating an optical fiber holder, a rotation mechanism, and a clamp unit according to further Modified Example.
Figure 8:
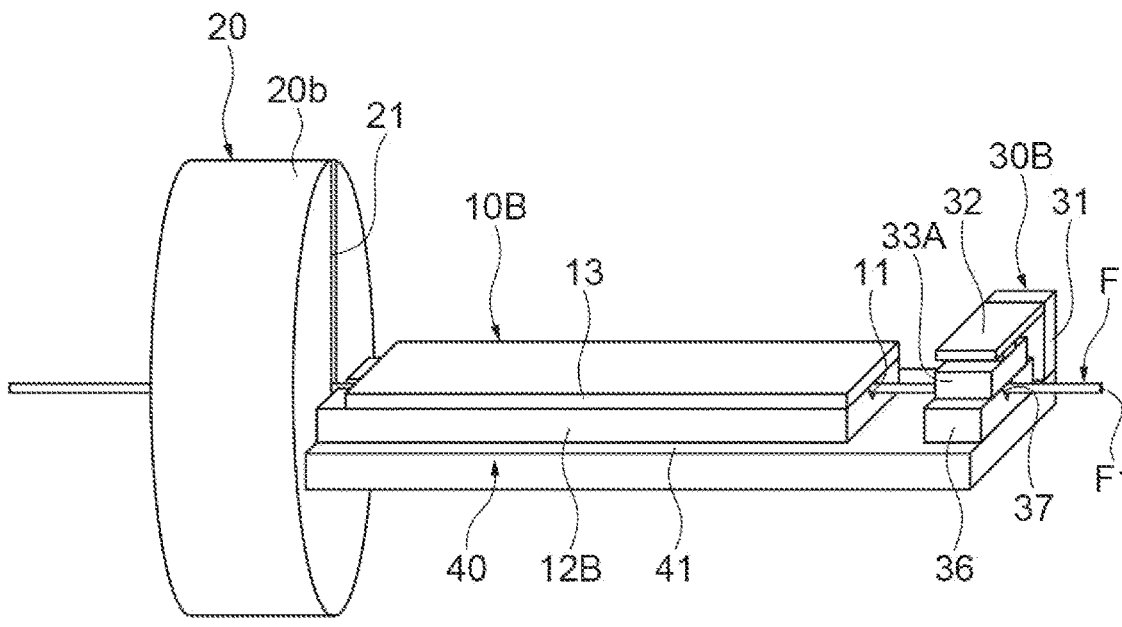
FIG. 8 is a perspective view schematically illustrating the optical fiber holder, the rotation mechanism, and the clamp unit in FIG. 7.
Figure 8:
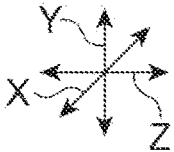

Next, the fusion splicing machine according to another Modified Example will be described. FIG. 7 is a side view illustrating an optical fiber holder 10B, the rotation mechanism 20, a clamp unit 30B, and the holder base 40 according to this Modified Example. FIG. 8 is a perspective view illustrating the optical fiber holder 10B, the rotation mechanism 20, the clamp unit 30B, and the holder base 40. As illustrated in FIGS. 7 and 8, in the fusion splicing machine according to this Modified Example, the respective configurations of the optical fiber holder 10B and the clamp unit 30B are different from the respective configurations of the optical fiber holder 10 and the clamp unit 30 described above.

The optical fiber holder 10B includes a base 12B on which the V-groove 11 is formed and the lid 13. The base 12 of the optical fiber holder 10 described above extends to the opposite side of the rotation mechanism 20 beyond the lid 13. However, the base 12B of the optical fiber holder 10B does not extend to the opposite side of the rotation mechanism 20 beyond the lid 13.

The clamp unit 30B includes the fixing portion 31, the extension portion 32, the pressing portion 33A, and the base 36 on which a V-groove 37 on which the optical fiber F is placed is formed. For example, the direction in which the optical fiber F extends along the V-groove 37 is the Z-axis direction. The base 36 is fixed, for example, to the mounting surface 41 of the holder base 40. The base 36 is arranged so that the V-groove 37 is positioned on the extension of the V-groove 11 of the base 12B. The optical fiber F extending from the V-groove 11 is placed on the V-groove 37.

In the clamp unit 30B, the optical fiber F placed on the V-groove 37 is pressed by the pressing portion 33A. As described above, also in the fusion splicing machine according to the present Modified Example, the rotation mechanism 20 rotates the clamp unit 30B together with the optical fiber holder 10B. Therefore, since the rotation mechanism 20 rotates the optical fiber F in the state where the clamp unit 30B presses the optical fiber F, the optical fiber F can be efficiently rotated. Therefore, from the fusion splicing machine according to this Modified Example, the same functions and effects as the fusion splicing machine 1 described above can be obtained. As in each of Modified Examples described above, the shape and arrangement of the clamp unit can be changed as appropriate.

The embodiments and various modifications of the fusion splicing machine according to the present disclosure have been described above. However, the invention is not limited to the above-described embodiments or modifications. That is, it is easily recognized by those skilled in the art that the present invention can be variously modified and changed within the scope of the spirit described in the scope of the claims. The configuration of each unit of the fusion splicing machine can be changed as appropriate within the scope of the above spirit. That is, the shape, size, number, material, and arrangement of each unit of the fusion splicing machine according to the present disclosure are not limited to the above-described embodiments, and can be changed as appropriate.

For example, in the above-described embodiments, the example in which the optical fiber holder 10 is detachable with respect to the holder base 40 has been described. However, the optical fiber holder may not be detachable from the holder base. The fusion splicing machine may not have the holder base 40. In this case, the fusion splicing machine in which the optical fiber holder 10 is fixed to the rotation mechanism 20 may be used.

REFERENCE SIGNS LIST

1: fusion splicing machine, 2: discharge electrode, 3: control unit, 10, 10B: optical fiber holder, 11: V-groove, 12, 12B: base, 12b: exposed portion, 13: lid, 14: first end portion, 20: rotation mechanism, 20b: peripheral surface, 21: recessed portion, 30, 30A, 30B: clamp unit, 31: fixing portion, 32: extension portion, 33, 33A: pressing portion, 34: arm portion, 35: tip end portion, 36: base, 37: V-groove, 40: holder base, 41: mounting surface, 42: second end portion, F: optical fiber, F1: tip end.

What is claimed is:

1. A fusion splicing machine comprising:

an optical fiber holder holding an optical fiber in a state where a tip end of the optical fiber protrudes;

a rotation mechanism arranged on an opposite side of the optical fiber holder to the tip end of the optical fiber and rotating the optical fiber holder around an axis extending along the optical fiber;

a clamp unit pressing the tip end portion of the optical fiber held by the optical fiber holder; and a holder base mounting the optical fiber holder and fixed to the rotation mechanism, wherein the rotation mechanism rotates the optical fiber, the optical fiber holder, the clamp unit, and the holder base around a Z-axis extending along the optical fiber, wherein the clamp unit, the holder base, and the optical fiber holder are within a range closer to a central axis of the rotation mechanism than an outer periphery of the rotation mechanism when viewed from a direction of the Z-axis, wherein the optical fiber holder has a first end portion positioned at a side opposite to the rotation mechanism, wherein the holder base has a second end portion positioned at the side opposite to the rotation mechanism, and a distance from the rotation mechanism to the second end portion in a direction in which the optical fiber extends is shorter than a distance from the rotation mechanism to the first end portion in the direction in which the optical fiber extends, wherein the optical fiber holder has a V-groove on which the optical fiber is placed, and wherein the clamp unit comprises a fixed part fixed to the holder base, an extending part extending in a width direction of the holder base from an end portion of the fixed part on a side opposite to the holder base, and a pressing part extending along the V-groove from the extending part.

2. The fusion splicing machine according to claim 1, wherein the clamp unit has a pressing portion pressing the optical fiber placed on the V-groove, and wherein the pressing portion includes an elastic member deformable in the direction toward the V-groove.

3. The fusion splicing machine according to claim 2, wherein the elastic member extends along the V-groove.

4. The fusion splicing machine according to claim 3, wherein the pressing portion has an arm portion extending along the V-groove and a tip end portion provided at one longitudinal end of the arm portion and pressing the optical fiber.

5. The fusion splicing machine according to claim 1, wherein the optical fiber holder is removable from the holder base.

6. The fusion splicing machine according to claim 5, wherein the holder base is made of metal.

7. The fusion splicing machine according to claim 5, wherein the holder base is made of resin.

* * * * *